US006758571B2

(12) United States Patent
Heaton

(10) Patent No.: US 6,758,571 B2
(45) Date of Patent: Jul. 6, 2004

(54) SCANNING MEMS MIRROR WITH RELUCTANCE FORCE MOTOR

(75) Inventor: Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 46 days.

(21) Appl. No.: 10/260,800

(22) Filed: Sep. 30, 2002

(65) Prior Publication Data

US 2004/0061960 A1 Apr. 1, 2004

(51) Int. Cl.[7] .............................................. G02B 7/182
(52) U.S. Cl. ......................... 359/872; 359/224; 385/18
(58) Field of Search ................................ 359/871, 872, 359/875, 876, 223, 224, 225; 385/16, 18

(56) References Cited

U.S. PATENT DOCUMENTS 6,108,118 A * 8/2000 Minamoto ................... 359/224

2003/0190116 A1 * 10/2003 Freeman et al. ............. 385/18

* cited by examiner

Primary Examiner—Euncha Cherry
(74) Attorney, Agent, or Firm—William B. Kempler; W. James Brady, III; Frederick J. Telecky, Jr.

(57) ABSTRACT

A movable mirror device driven by a reluctance force motor is provided. A sheet of material has a mirror portion, a hinge portion, and a frame portion formed therein. The mirror portion is coupled to the frame portion via the hinge portion. The reluctance force motor is formed from a magnetic flux channeling circuit. A wire coiled about a portion of the magnetic circuit is used to induce a magnetic field through the magnetic circuit. Air gaps in the magnetic circuit provide attractive forces between portions of the magnetic circuit when a magnetic field is present in the magnetic circuit. The air gaps and the magnetic circuit are configured so that the magnetic attractive forces at the air gaps exert torque on the mirror portion about the hinge portion. When the hinge portion is twisted, it acts as a torsional spring biasing the mirror portion toward a neutral relaxed position.

20 Claims, 12 Drawing Sheets

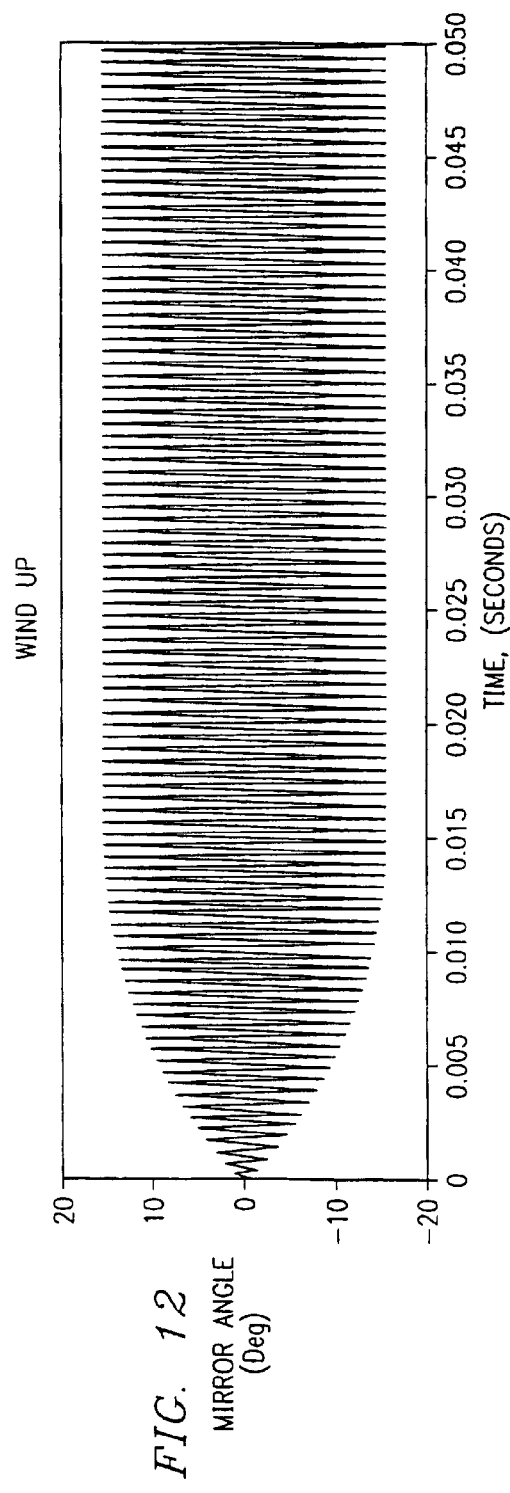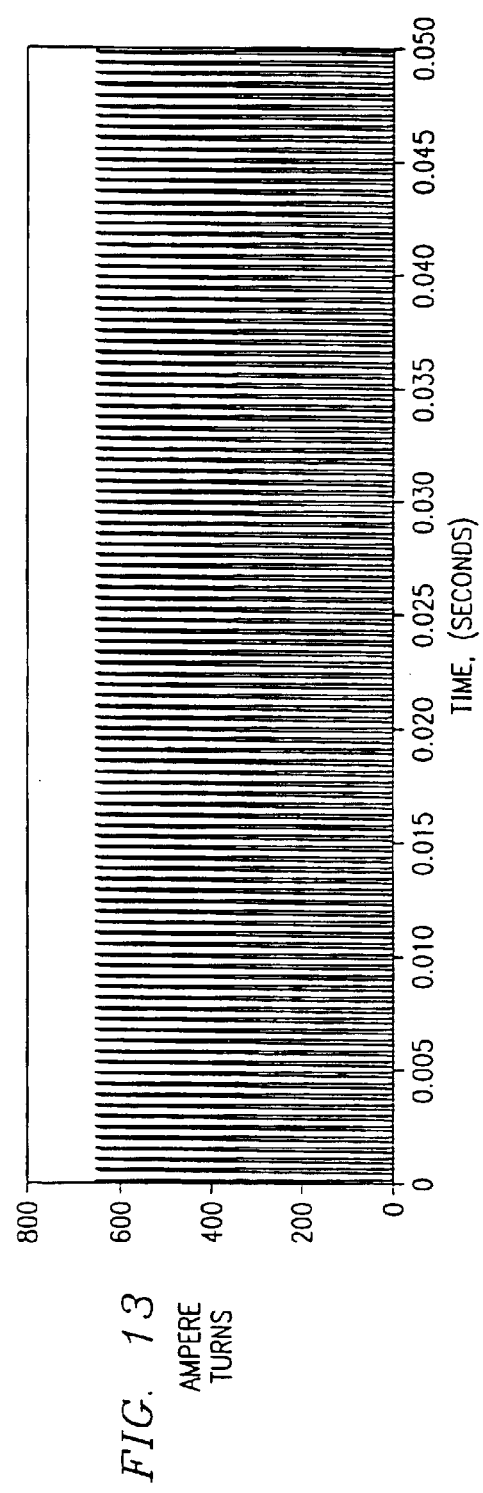

SCANNING MEMS MIRROR WITH RELUCTANCE FORCE MOTOR

TECHNICAL FIELD

The present invention relates to scanning micro-electromechanical systems (MEMS) mirrors using a motor to drive at least part of a mirror's movement.

BACKGROUND

Movable mirrors are often used to scan a reflected laser beam in systems such as bar code readers and in laser printers. One common way to provide a movable mirror is to have a spinning polygonal body having mirrored or highly reflective surfaces. One of the downsides to the spinning polygon mirror is that it only scans across in one direction. Another downside to the spinning polygon mirror is the spin-up time required to get the polygonal body spinning at the needed angular velocity, which is typically more than 50 milliseconds. In addition, polygon mirrors are known to be noisy devices. There is a need for a movable mirror device with a quicker spin-up time (i.e., less than 50 milliseconds).

Magnets and/or electromagnets are sometimes used for driving the movement of a mirror. Often magnetically driven mirrors have one or more magnets attached to the mirror. There are several downsides to attaching one or more magnets to the mirror. One downside is that magnets add cost to the device. Not only does the magnetic material add cost, but the procedure and tooling to accurately mount the magnet may add cost. Magnet mounting may induce asymmetric forces that distort the mirror. Also, magnet mounting may induce thermal stresses that distort the mirror. Also, many current designs lack rotational stops, which reduces robustness of the device. Hence, there is a need for a movable mirror system that addresses these shortcomings.

BRIEF SUMMARY OF THE INVENTION

The problems and needs outlined above are addressed by embodiments of the present invention. In accordance with one aspect of the present invention, a movable mirror device is provided. The movable mirror device includes a sheet, a magnetic flux channeling circuit, and a wire of electrically conducting material. The sheet has a frame portion, a hinge portion, and a mirror portion formed therein. The sheet may comprise a silicon based material, for example. The hinge portion has a pivot axis. The mirror portion is coupled to the frame portion via the hinge portion so that the mirror portion can pivot about the pivot axis relative to the frame portion. The hinge portion is twisted when the mirror portion pivots about the pivot axis and the twisted hinge portion biases the mirror portion toward a neutral relaxed position where the mirror portion is substantially aligned with a plane of the frame portion. The mirror portion has a first side and a second side. The frame portion at least partially borders the mirror portion.

The magnetic flux channeling circuit includes four circuit portions. The portions of the magnetic flux channeling circuit may comprise a nickel-iron alloy, for example. The first circuit portion is attached to the first side of the mirror portion, and the first circuit portion is separated from the remainder of the magnetic circuit portions when the mirror portion is in the neutral position. The second circuit portion extends on the first side of the mirror portion. An end of the second circuit portion is separated from the first circuit portion by a first spaced distance when the mirror portion is in the neutral position. The third circuit portion extends on the second side of the mirror portion. An end of the third circuit portion is separated from the second side of the mirror portion by a second spaced distance when the mirror portion is in the neutral position. The wire is coiled about the fourth circuit portion such that a magnetic field is induced within the fourth circuit portion and through the magnetic flux channeling circuit when electrical current flows through the wire.

There are many possible configurations for the arrangement of the magnetic circuit portions, and hence many possible embodiments. For example, the second, third, and fourth circuit portions may be part of a single piece, such that magnetic flux may flow through the magnetic flux channeling circuit from the fourth circuit portion to the second circuit portion, to the first circuit portion, to the third circuit portion, and back to the fourth circuit portion to complete one circuit loop. The magnetic circuit may include one or more additional magnetic circuit portions. For example, the magnetic flux channeling circuit may further include a fifth circuit portion attached to the second side of the mirror portion, wherein the end of the third circuit portion is separated from the fifth circuit portion by a third spaced distance when the mirror portion is in the neutral position. In such case, the magnetic flux may flow through the magnetic flux channeling circuit from the fourth circuit portion to the second circuit portion, to the first circuit portion, to the fifth circuit portion, to the third circuit portion, and back to the fourth circuit portion to complete one circuit loop.

As another example, the magnetic flux channeling circuit may further include a sixth circuit portion, a seventh circuit portion, a eighth circuit portion, a ninth circuit portion, and a tenth circuit portion. The sixth circuit portion may be attached to the first side of the mirror portion, such that the sixth circuit portion is separated from the remainder of the magnetic circuit portions when the mirror portion is in the neutral position. The seventh circuit portion may be attached to the second side of the mirror portion, such that the seventh circuit portion is separated from the remainder of the magnetic circuit portions when the mirror portion is in the neutral position. The eighth circuit portion may extend on the first side of the mirror portion, such that an end of the eighth circuit portion is separated from the sixth circuit portion by a fourth spaced distance when the mirror portion is in the neutral position. The ninth circuit portion may extend on the second side of the mirror portion, such that an end of the ninth circuit portion is separated from the seventh circuit portion by a fifth spaced distance when the mirror portion is in the neutral position. The tenth circuit portion may extend between and connect the third circuit portion to the ninth circuit portion. In such case, the second circuit portion, the fourth circuit portion, and the eighth circuit portion form a single piece, and the third, ninth, and tenth circuit portions form another single piece. Hence in such case, the magnetic flux may flow through the magnetic flux channeling circuit from the fourth circuit portion to the second circuit portion, to the first circuit portion, to the fifth circuit portion, to the third circuit portion, to the tenth circuit portion, to the ninth circuit portion, to the seventh circuit portion, to the sixth circuit portion, to the eighth circuit portion, and back to the fourth circuit portion to complete one circuit loop.

The ends of the second and eighth circuit portions may provide a first set of pivot stops to limit the pivotal movement range of the mirror portion in a first angular direction. Similarly, the ends of the third and ninth circuit portions may provide a second set of pivot stops to limit the pivotal movement range of the mirror portion in the first angular direction. The pivotal movement range of the mirror portion in the first angular direction from the neutral position may be about 15 degrees, for example. Preferably, the device is adapted to allow the mirror portion to pivot a total of about 30 degrees.

A laser printer device, a bar code scanner system, or a digital light projector may be provided that incorporates a movable mirror device in accordance with the present invention, for example.

BRIEF DESCRIPTION OF THE DRAWINGS

The above features of the present invention will be more clearly understood from consideration of the following descriptions in connection with accompanying drawings in which:

FIG. 1 is perspective view of a first embodiment of the present invention;

FIG. 2 is a cross-section view of FIG. 1 taken along line 2—2;

FIG. 12 is a plot showing mirror angle versus time for an initial wind up period of the third embodiment;

FIG. 13 is a plot showing ampere turns versus time for the initial wind up period of the third embodiment corresponding to FIG. 12;

DETAILED DESCRIPTION OF PREFERRED EMBODIMENTS

Figure 3:
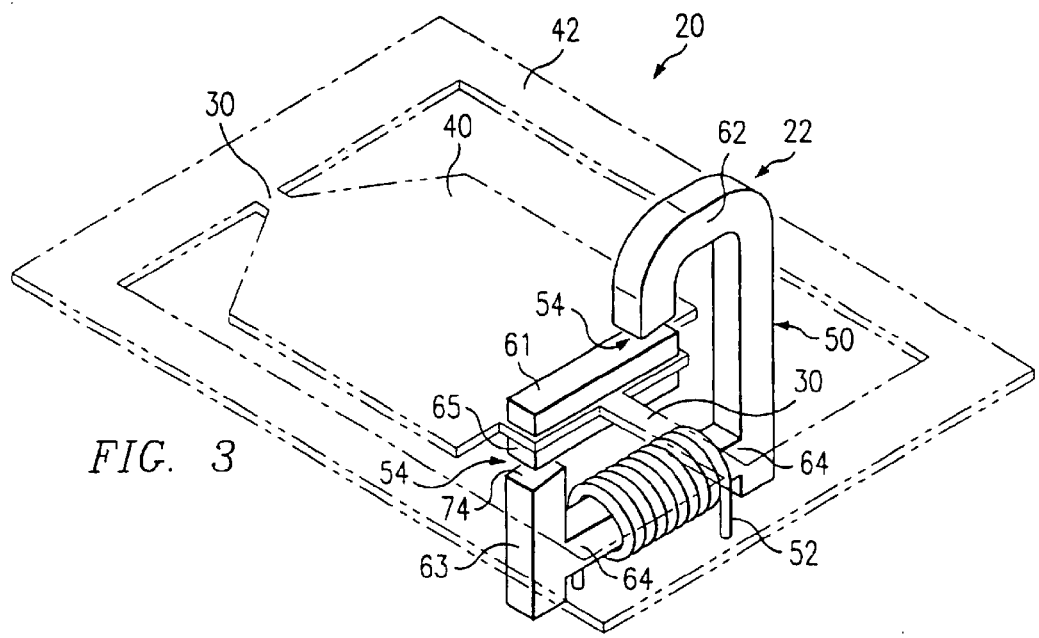
FIG. 3 is a perspective view of the first embodiment of FIG. 1 with portions shown in phantom lines.

Referring now to the drawings, wherein like reference numbers are used herein to designate like elements throughout the various views, preferred embodiments of the present invention are illustrated and described. As will be understood by one of ordinary skill in the art, the figures are not necessarily drawn to scale, and in some instances the drawings have been exaggerated and/or simplified in places for illustrative purposes only. One of ordinary skill in the art will appreciate the many applications and variations of the present invention in light of the following description for some preferred embodiments of the present invention. The preferred embodiments discussed herein are just some illustrative examples of the present invention and do not limit the scope of the invention to the preferred embodiments described.

Figures 1, 2:
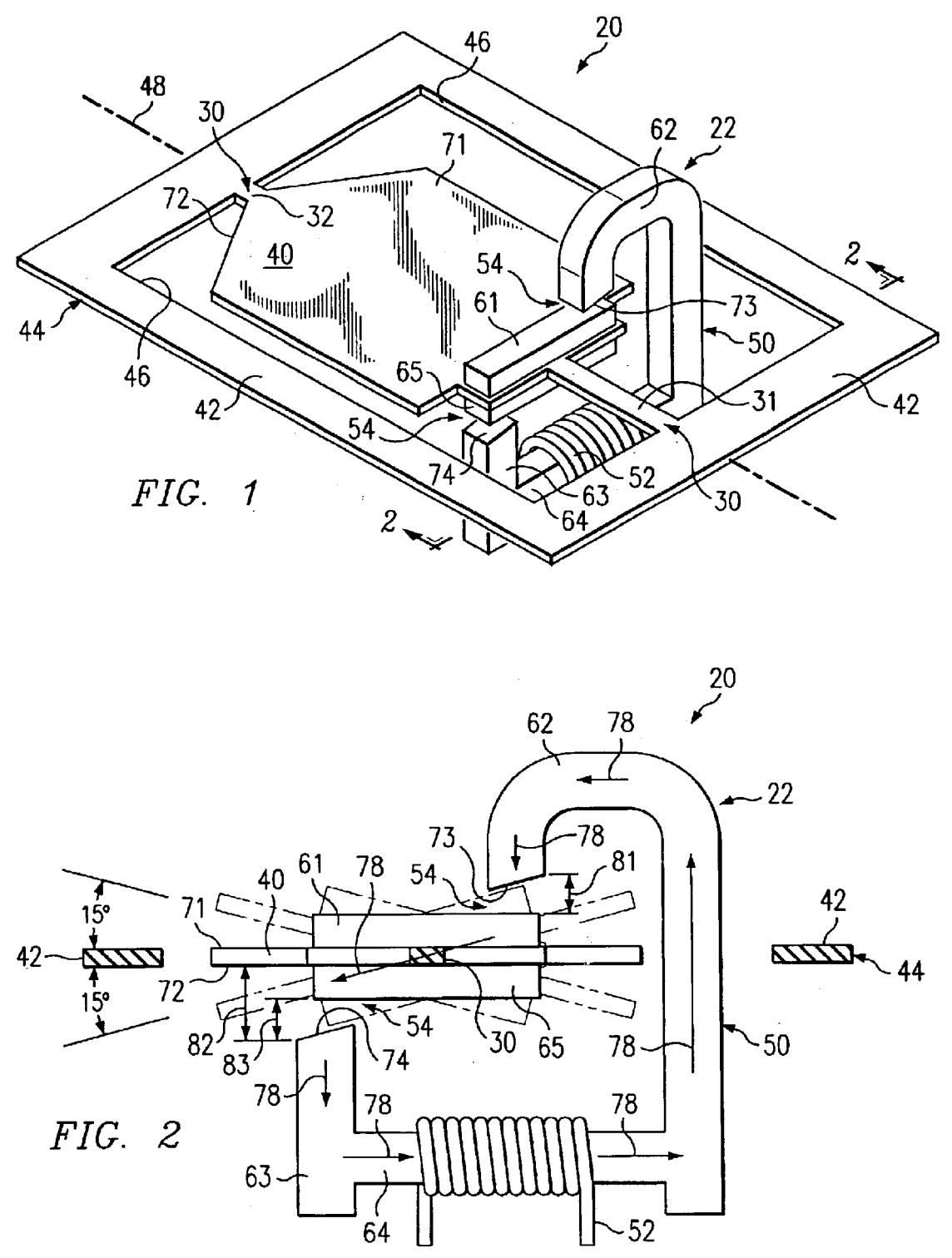

The present invention relates to scanning mirrors using micro-electro-mechanical systems (MEMS) to drive at least part of a mirror's movement. Generally, an embodiment of the present invention provides a movable mirror device 20 driven by a reluctance force motor 22. The following description and FIGS. 1–4 pertain to a first embodiment of the present invention.

FIG. 1 shows a perspective view of the first embodiment. FIG. 2 shows a cross-section view of the first embodiment from FIG. 1 taken along line 2—2. In the first embodiment, a hinge portion 30, a mirror portion 40, and a frame portion 42 are formed in a sheet 44 of silicon by machining or etching the patterns for the holes 46 (i.e., leaving the formed portions). Thus, the mirror portion 40 is coupled to the frame portion 42 by the hinge portion 30. The mirror portion 40 acts as a movable mirror. The mirror portion 40 may be merely polished (i.e., using the polished silicon to form a reflective medium), or another material layer may be formed on the mirror portion 40 and polished to provide the mirror function, for example. The sheet 44 may be formed from a variety of materials, including (but not limited to): single crystal silicon, poly silicon, oxide, nitride and/or metal films, for example.

The hinge portion 30 has two parts 31, 32 and a pivot axis 48. A first part 31 of the hinge portion 30 is located on one end of the mirror portion 40, and a second part 32 is located on an opposite end. The hinge portion 30 supports the mirror portion 40. When the mirror portion 40 is pivoted about the hinge portion 30 relative to frame portion 42, as shown in phantom lines in FIG. 2, the hinge portion 30 is twisted about the pivot axis 48. Such twisting of the hinge portion 30 causes the hinge portion 30 to act as a torsion bar. Hence, the hinge portion 30 biases the mirror portion 40 toward a neutral, relaxed position where the mirror portion is substantially aligned with a plane where the frame portion 42 lies (i.e., the plane of the sheet 44).

Figure 4:
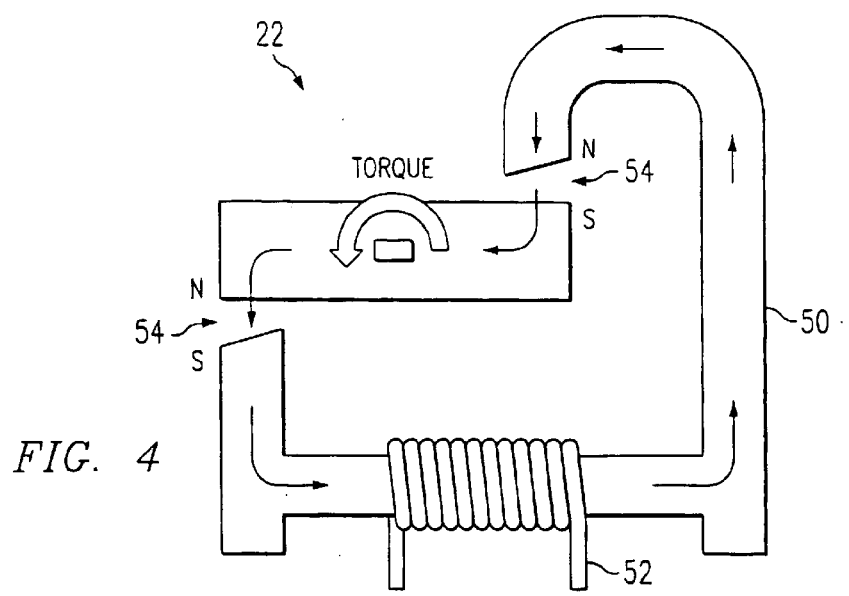
FIG. 4 is a simplified schematic of the magnetic circuit of the first embodiment.

FIG. 3 shows the perspective view of FIG. 1 with the hinge portion 30, mirror portion 40, and frame portion 42 shown in phantom lines to better show the reluctance force motor 22. The reluctance force motor 22 includes a magnetic flux channeling circuit 50 and a wire 52 of electrically conducting material coiled about a portion of the magnetic flux channeling circuit 50. The wire 52 is insulated from the magnetic flux channeling circuit 50. When current flows through the coiled wire 52, a magnetic field is induced through the magnetic flux channeling circuit 50. The magnetic field then causes an attractive magnetic force to minimize the reluctance in the air gaps 54 of the magnetic circuit 50 formed. FIG. 4 shows a simplified schematic of the reluctance force motor 22 and the magnetic circuit formed by the magnetic flux channeling circuit 50 of the first embodiment, as well as the path of the magnetic flux through the circuit 50.

To describe the magnetic flux channeling circuit 50, it may be helpful to break it up into portions. Referring to FIGS. 1–3, a first circuit portion 61 is a strip attached to a first side 71 of the mirror portion 40. The strip of the first circuit portion 61 may be attached using an epoxy, for example. In this example, the first side 71 of the mirror portion 40 may be the side in which a laser beam (not shown) will be reflected off of during use of the first embodiment for an application such as a scanning mirror for a laser printer, for example. A second circuit portion 62 extends on the first side 71 of the mirror portion 40. An end 73 of the second circuit portion 62 terminates facing the first circuit portion 61. The second circuit portion 62 is curved to form an arc toward another circuit portion (64) on the second side 72 of the mirror portion 40. A third circuit portion 63 extends on the second side 72 of the mirror portion 40. An end 74 of the third circuit portion 63 terminates facing towards the second side 72 of the mirror portion 40. A fourth circuit portion 64 has the wire 52 coiled thereabout. A fifth circuit portion 65 is a strip attached to the second side 72 of the mirror portion 40, preferably directly opposite the first portion 71. As shown by the magnetic field arrows 78 in FIGS. 2 and 4, one of the magnetic flux paths is from the fourth circuit portion 64 to the second circuit portion 62, to the first circuit portion 61, to the fifth circuit portion 65, to the third circuit portion 63, and back to the fourth circuit portion 64 to complete the circuit loop. If the current direction is reversed in the wire 52, the magnetic field orientation will be reversed along the same magnetic flux path.

Note in FIGS. 2 and 4 that there are two gaps 54 where attractive magnetic forces exist when the magnetic poles are established by the magnetic field in the magnetic circuit 50. As indicated in FIG. 4, the attractive magnetic forces at the gaps 54 creates a moment about the hinge portion 30 (i.e., about the pivot axis 48). When the torque of the moment created by the magnetic forces at the gaps 54 is larger than the torque required to twist the hinge portion 30, the mirror portion 40 pivots about the pivot axis 48. As the hinge portion 30 is twisted further and the gaps 54 close, the magnetic force will increase and the torsional bias provided by the hinge portion 30 will continue to increase as long as the material in the hinge portion 30 remains within its elastic range for deflection. Due to the geometric configuration of the magnetic flux channeling circuit 50 and the locations of the gaps 54, either direction of the magnetic field (arrows 78) will result in the same effect on the pivotal movement of the mirror portion 40 about the pivot axis 48.

The ends 73, 74 of the second and third circuit portions 62, 63 provide pivot stops to limit the pivotal movement range of the mirror portion 40 in a first direction. If the hinge portion 30 is twisted beyond the range of elasticity for its material, it will fracture or reach a plastic state where it will not rebound fully to its original neutral position. In either case (fracture or plastic deformation) the hinge portion 30 will be damaged. Thus, the pivot stop function provided by the ends 73, 74 of the second and third portions 62, 63 may save the device from permanent damage in the event of an unplanned current above the intended limit or sustained beyond an intended period of time in the coiled wire 52. As discussed further below, in normal operation the first and fifth circuit portions 61, 65 should not hit the ends 73, 74 of the second and third circuit portions 62, 63, as it will disrupt the oscillating movement of the mirror portion 40 and the mirror portion 40 will lose part of its kinetic energy due to a collision with the stops (ends 73, 74).

As shown in FIG. 1, note that each part of the hinge portion 30 in the first embodiment has a different width and length. Hence, although the parts 31, 32 of the hinge portion 30 may be identical on each side, they need not be the same. Also note that the shape of the mirror portion 40 may vary for different embodiments.

Figure 5:
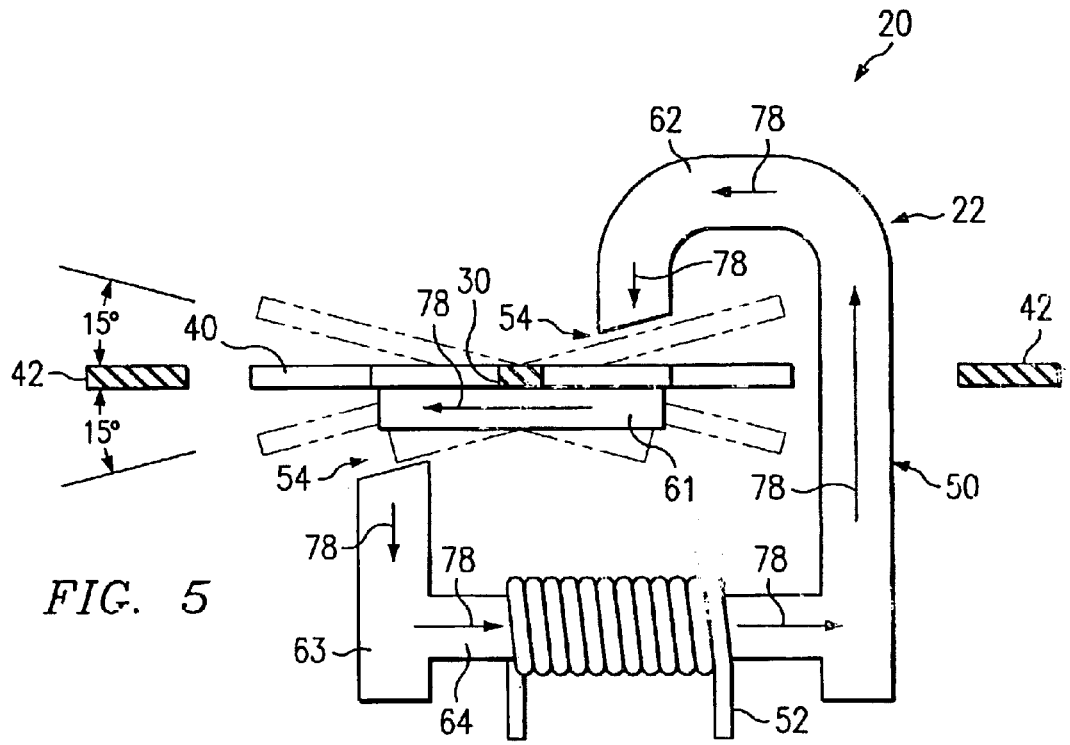
FIG. 5 is a cross-section view of a second embodiment of the present invention.

FIG. 5 shows a cross-section view of a second embodiment of the present invention. The second embodiment is essentially the same as the first embodiment, except that the second embodiment has only one circuit portion attached to the mirror portion 40 rather than two. Thus, the number of circuit portions attached to the mirror portion 40 may vary for different embodiments. Although the second embodiment is feasible, the first embodiment will likely work better.

Figure 7:
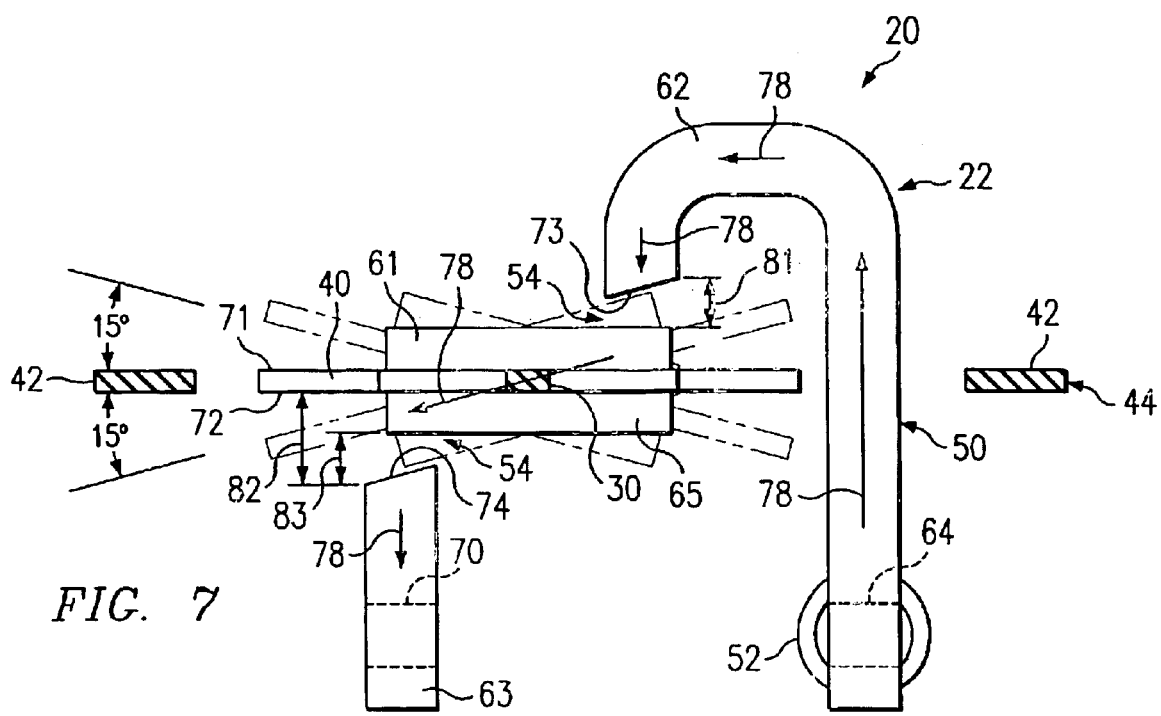
FIGS. 7–9 are cross-section views of FIG. 6 as taken along lines 7—7, 8—8, and 9—9, respectively.
Figure 6:
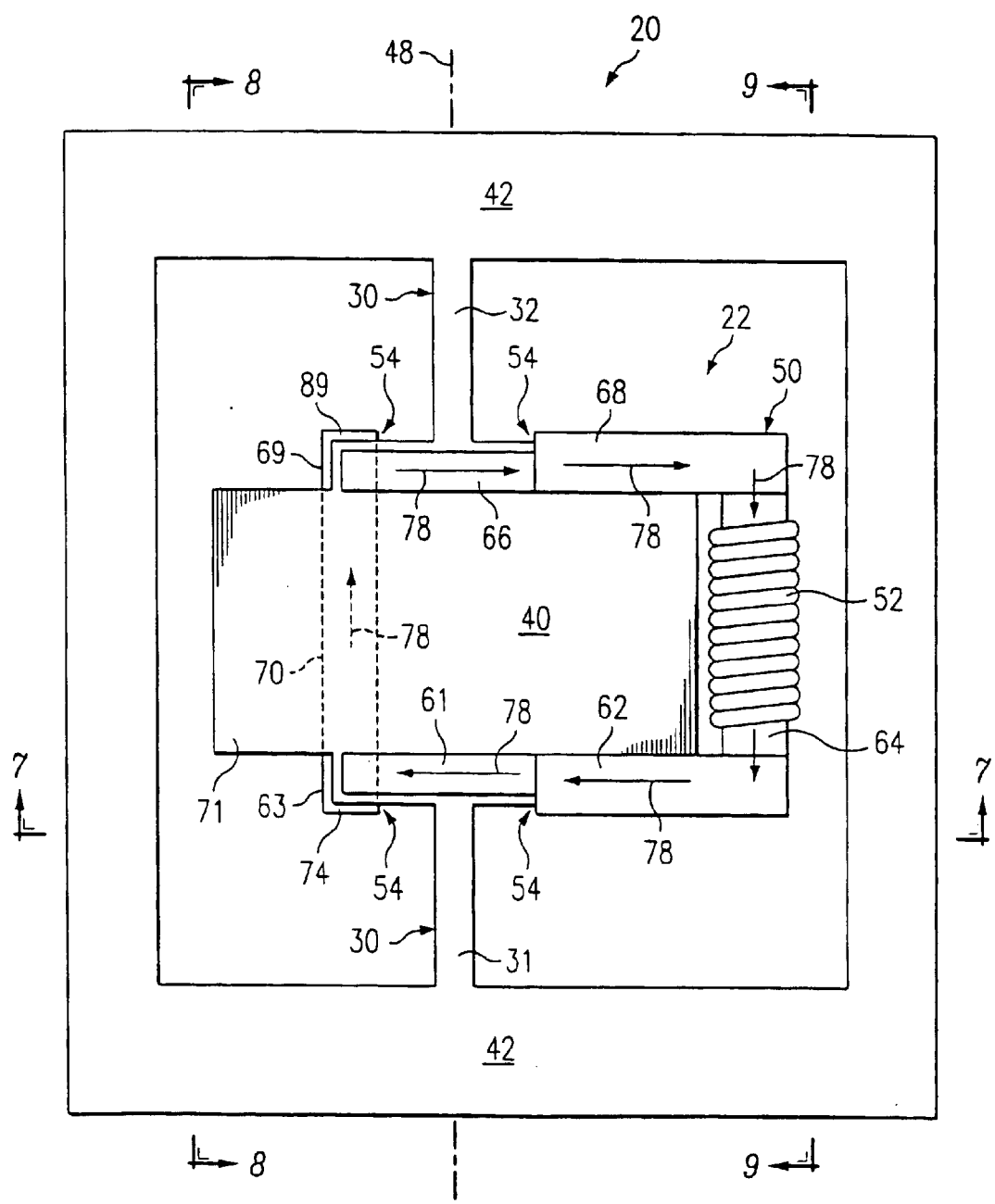
FIG. 6 is a top view of a third embodiment of the present invention.
Figure 8:
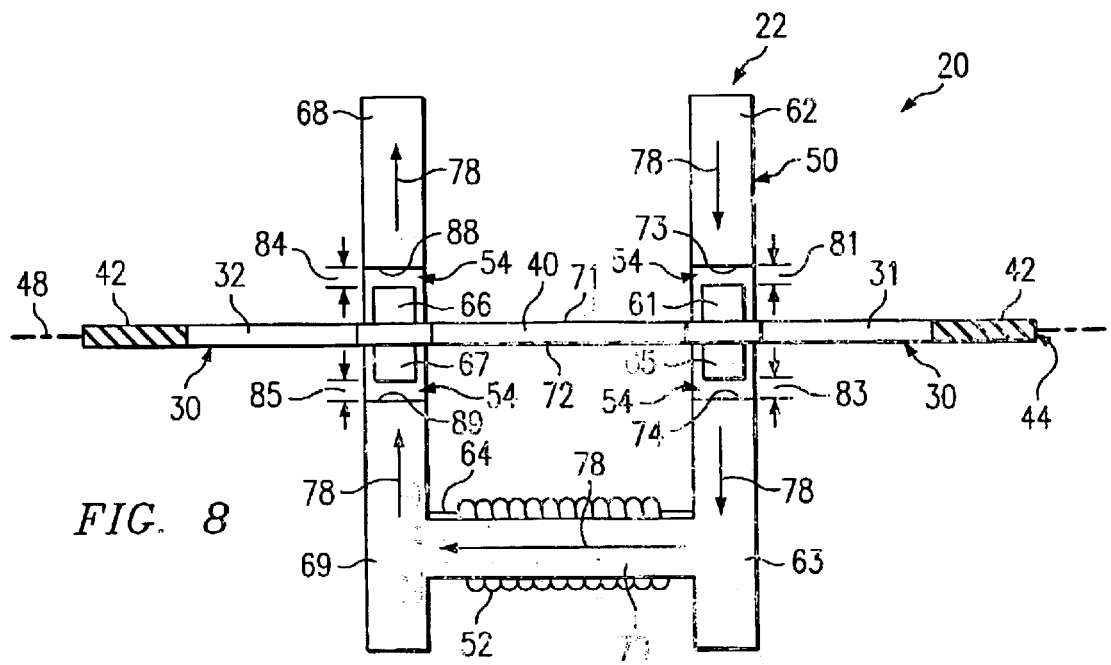
Figure 9:
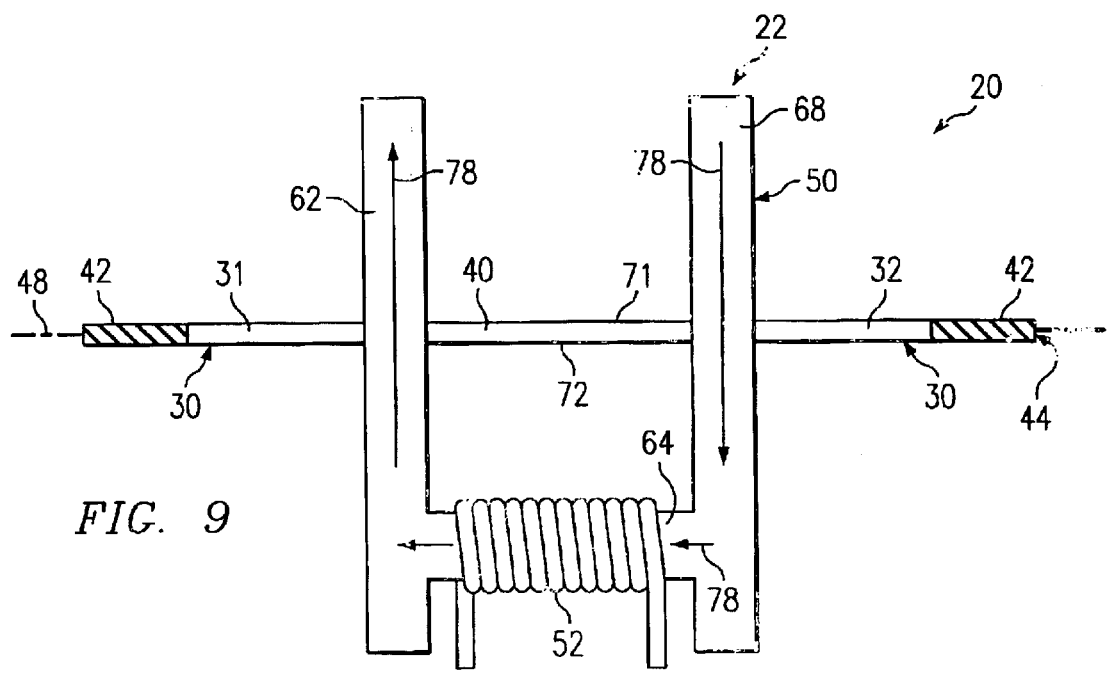
Figure 10:
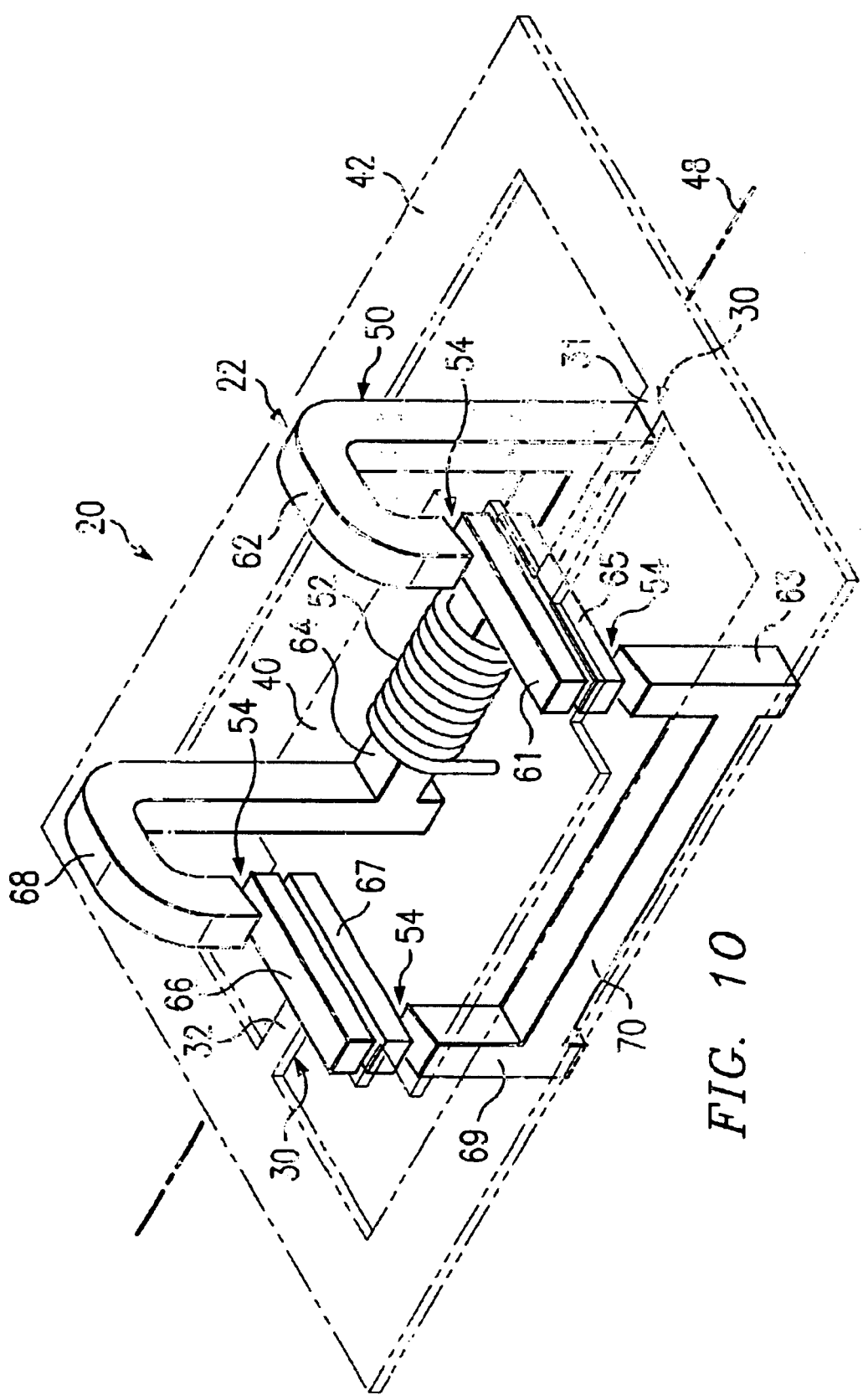
FIG. 10 is a perspective view of the third embodiment of FIGS. 6–9 with portions shown in phantom lines.

FIGS. 6–10 show a third embodiment of the present invention. FIG. 6 is a top view of the third embodiment. FIG. 7 is a cross-section view of FIG. 6 taken along line 7—7. FIGS. 8 and 9 are cross-section views of FIG. 6 taken along lines 8—8 and 9—9, respectively. FIG. 10 is a perspective view of the third embodiment with the hinge portion 30, mirror portion 40, and frame portion 42 shown in phantom lines for purposes of illustrating the magnetic flux channeling circuit 50. Regarding the size of the third embodiment, the mirror portion 40 is about 4 mm by 3 mm. The sheet 44 is about 120 μm thick. Each side of the hinge portion 30 is about 60 μm wide and about 1200 μm long. As will be described further below, the device 20 of the third embodiment is designed to operate at a resonance frequency of about 2 kHz.

The magnetic flux channeling circuit 50 of the third embodiment has many more circuit portions than that of the first embodiment described above. Continuing with the same terminology used to describe the first embodiment, the third embodiment includes ten circuit portions. As in the first embodiment, the first and fifth circuit portions 61, 65 are strips attached to the mirror portion 40. The second circuit portion 62 extends on the first side 71 of the mirror portion 40. An end 73 of the second circuit portion 62 terminates facing the first circuit portion 61 so that the second circuit portion 62 is separated from the first circuit portion 61 by a first spaced distance 81 when the mirror portion is in the neutral position. The third circuit portion 63 extends on the second side 72 of the mirror portion 40. An end 74 of the third circuit portion 63 terminates facing the fifth circuit portion 65 so that the third circuit portion 63 is separated from the second side 72 of the mirror portion 40 by a second spaced distance 82, and is separated from the fifth circuit portion 65 by a third spaced distance 83, when the mirror portion 40 is in the neutral position. The fourth circuit portion 64 has the wire 52 coiled thereabout.

In the third embodiment (see e.g., FIG. 10), a sixth circuit portion 66 is a strip attached to the first side 71 of the mirror portion 40. The sixth circuit portion 66 is the same as the first circuit portion 61, but is located on the opposite end of the mirror portion 40. A seventh circuit portion 67 is a strip, like the fifth circuit portion 65, attached to the second side 72 of the mirror portion 40. An eighth circuit portion 68 extends on the first side 71 of the mirror portion 40. An end 88 of the eighth circuit portion 68 terminates facing the sixth circuit portion 66 so that the eighth circuit portion 68 is separated from the sixth circuit portion 66 by a fourth spaced distance 84 when the mirror portion 40 is in the neutral position. The fourth circuit portion 64 extends between and connects the second circuit portion 62 to the eighth circuit portion 68. The second, fourth, and eighth circuit portions 62, 64, and 68 form a single piece. A ninth circuit portion 69 extends on the second side 72 of the mirror portion 40. An end 89 of the ninth circuit portion 69 terminates facing the seventh circuit portion 87 so that the ninth circuit portion 89 is separated from the seventh circuit portion 87 by a fifth spaced distance 85 when the mirror portion 40 is in the neutral position. A tenth circuit portion 70 extends between and connects the third circuit portion 63 to the ninth circuit portion 69. The third, ninth, and tenth circuit portions 63, 69, and 70 form a single piece. Arrows 78 in FIGS. 6–9 represent the magnetic field in one flow direction for the third embodiment when a current flows through the wire in a first direction. Following the arrows 78, current flowing through the coiled wire 52 induces a magnetic field along the fourth circuit portion 64. The direction of the magnetic field 78 in the circuit depends on the direction of the current flow within the coiled wire 52. In one direction of flow, the magnetic flux travels from the fourth circuit portion 64 to the second circuit portion 62, across the first spaced distance 81 (an air gap 54) to the first circuit portion 61, across the mirror portion 40 (which is a fixed gap) to the fifth circuit portion 65, through the fifth circuit portion 65, across the third spaced distance 83 (an air gap 54) to the third circuit portion 63, to the ninth circuit portion 69 via the tenth circuit portion 70, across the fifth spaced distance 85 (an air gap 54) to the seventh circuit portion 67, across the mirror portion 40 (which is a fixed gap) to the sixth circuit portion 66, from the sixth circuit portion 66 to the eighth circuit portion 68 across the fourth spaced distance 84 (an air gap 54), and back to the fourth circuit portion 64 to complete the magnetic circuit loop.

The third embodiment has a symmetrically configuration. Because the mirror portion 40 is driven on both ends and on both sides 71, 72, the mirror portion 40 is less likely to be distorted. Thus, such a symmetric configuration is preferred to get a consistent and undistorted reflection from the device 20. Note that the location of the wire 52 coiled about a portion of the circuit 50 may vary. The wire 52 may be coiled about an additional or an alternative circuit portion, such as the tenth circuit portion 70 for example.

Figure 11:
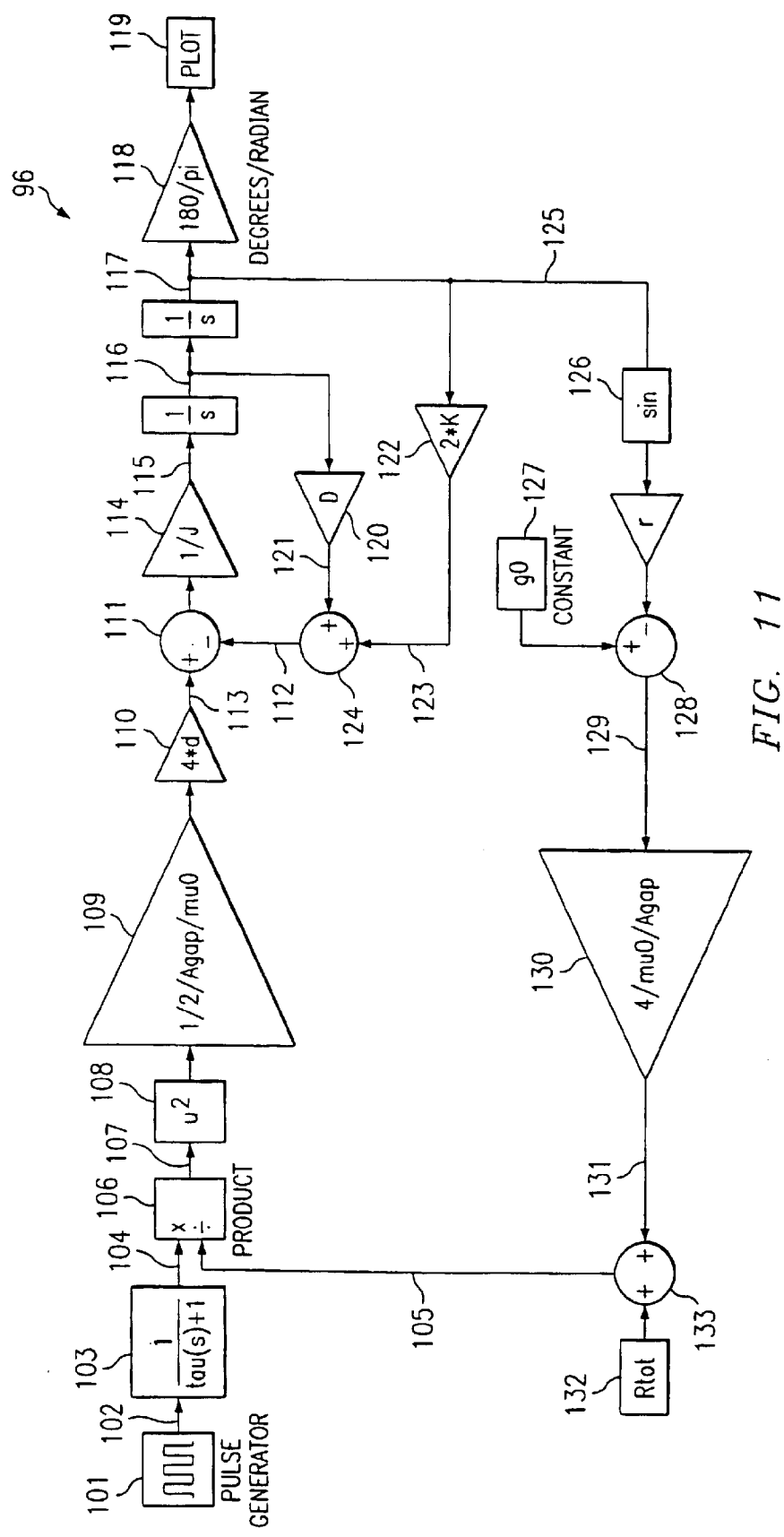
FIG. 11 is a mathematical model that may be used to simulate the third embodiment.

In a scanning mirror device (e.g., in a laser printer or a bar code scanner), it is often desirable to keep the mirror moving at a consistent rate with smooth, predictable movements. Using a model of the third embodiment to perform a software simulation, the inventor found that the third embodiment may be used to provide a consistent rate of movement while being smooth and having predictable movements. FIG. 11 is a schematic illustrating the mathematical model 96 used to calculate and simulate the movement of the mirror portion 40 of the third embodiment. The mathematical model 96 in FIG. 11 may be used for other embodiments of the present invention as well, but the constants will likely change to suit the configuration of another embodiment.

In operation, the motion of the mirror portion 40 is driven by the reluctance force motor 22 at certain portions of the mirror portion's range of movement. The movement and driving of the mirror portion's motion is analogous to a children's swing set. Imagine a child seated in a swing being pushed by an adult. When the child first starts to swing, there is little momentum and the swinging motion may gradually increase in height as the push remains the same and as the child gains momentum. The adult only pushes at a small segment of the child's range of motion. The child's kinetic energy is converted to potential energy as the child reaches the peak height, and then the potential energy of the child's height is converted back to kinetic energy by gravity as the child approaches the lowest part of the swinging motion. Assuming the child is not inputting energy into the swinging motion, the adult must maintain the periodic pushing of the child to maintain the child's swinging motion or to maintain the child's swinging height.

For the third embodiment, the magnetic force at the air gaps 54 is pulsed at the appropriate times to drive the oscillating movement of the mirror portion 40. Timing of the drive pulses are matched to the resonance of the spring mass system defined by the inertia of the mirror and the torsional stiffness of the hinge. When the mirror portion 40 causes the hinge portion 30 to be twisted, the mirror portion's inertia and momentum (i.e., the mirror portion's angular velocity) is converted from kinetic energy to potential energy stored in hinge portion 30. When the torsion of the hinge portion 30 equals or exceeds the moment from the moving mirror's momentum, the mirror portion 40 changes direction and the potential energy in the hinge portion 30 is converted into kinetic energy for the mirror portion 40 (i.e., the twisted hinge portion 30 drives the mirror's motion). Hence, the hinge portion 30 is in part analogous to the gravity exerted on the children's swing. Due to damping losses in the system during the mirror's motion, the mirror portion 40 must be driven to maintain its motion.

FIGS. 12–19 are plots showing the results of the simulation for the third embodiment. At the start-up of the mirror's motion, it takes some time (some cycles of oscillation) to reach a steady state (where each cycle of the mirror portion's oscillator movement is the same). The plot in FIG. 12 shows the wind-up time to reach steady state, which in this case is at about 2 kHz resonance frequency. The simulation of the third embodiment shows a wind-up time of about 20 milliseconds (see FIG. 12), which is much faster than 50 milliseconds, the typical wind-up time required for most existing scanning mirrors. As shown in FIG. 7, the third embodiment is designed to pivot 15 degrees in each direction for a total movement of about 30 degrees. Thus in the plot of FIG. 12, the vertical axis is mirror angle in degrees relative to the neutral position (zero degrees) and the horizontal axis is time.

Figure 14:
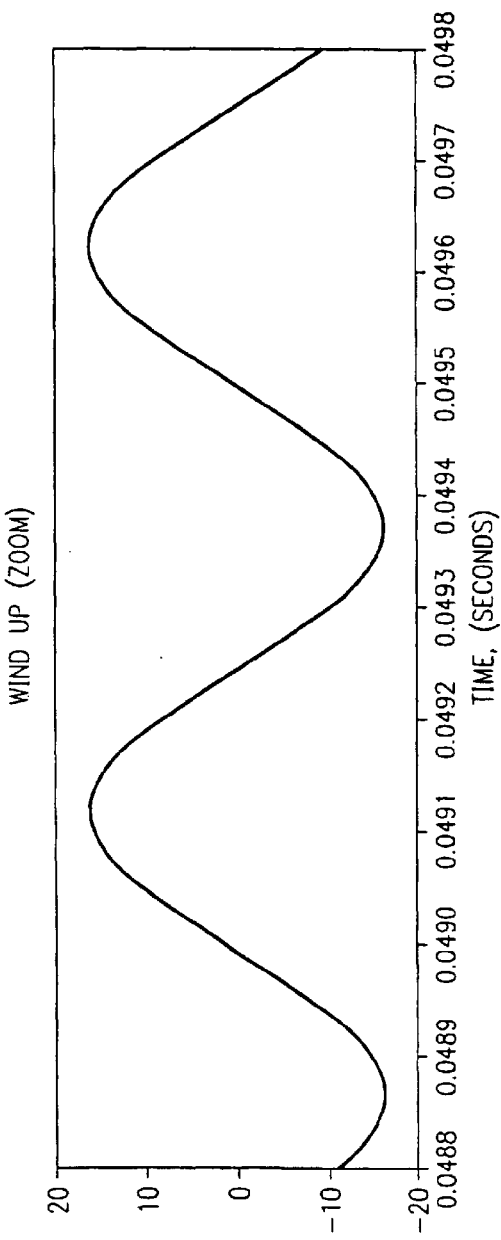
FIG. 14 is a plot showing a zoomed-in portion of the plot of FIG. 12.
Figure 15:
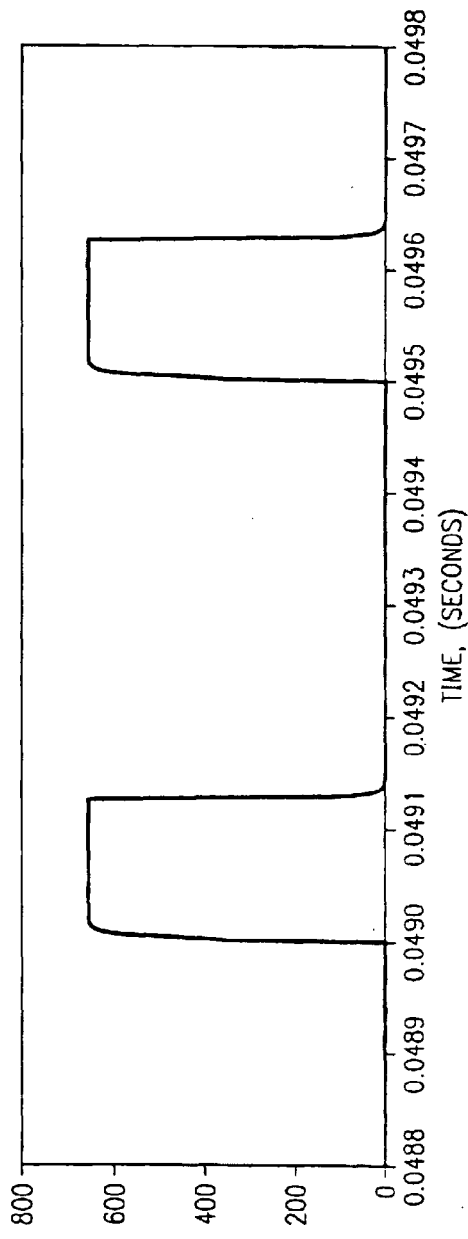
FIG. 15 is a plot showing a zoomed-in portion of the plot of FIG. 13, corresponding to FIG. 14.

FIG. 13 is a plot showing the ampere turns versus time corresponding to and along the same time scale of the FIG. 12 plot during the start-up. Hence, the driving force provided by the reluctance force motor 22 during start-up is the same as that provided during steady state operation, which is why there is a start-up period. FIGS. 14 and 15 are zoomed-in views of the plots shown in FIGS. 12 and 13, respectively, at the steady state region between 488 and 498 milliseconds. Referring to FIG. 14, the mirror angle follows a sinusoidal curve over time when driven by the pulse pattern shown in FIG. 15. Looking at the plots of FIGS. 14 and 15 together, note that the reluctance force motor 22 is pulsed for about one quarter (15 degrees) of one cycle. The inertia of the mirror portion 40 and the spring bias provided by the hinge portion 30 govern the motion of the mirror portion through the remaining three quarters of the cycle. The frequency of the current pulses through the coiled wire 52 must be timed in accordance with the resonance frequency of the device to maintain a smooth sinusoidal curve, as shown in FIG. 14, and to provide a consistent, smooth mirror oscillatory movement.

Figure 16:
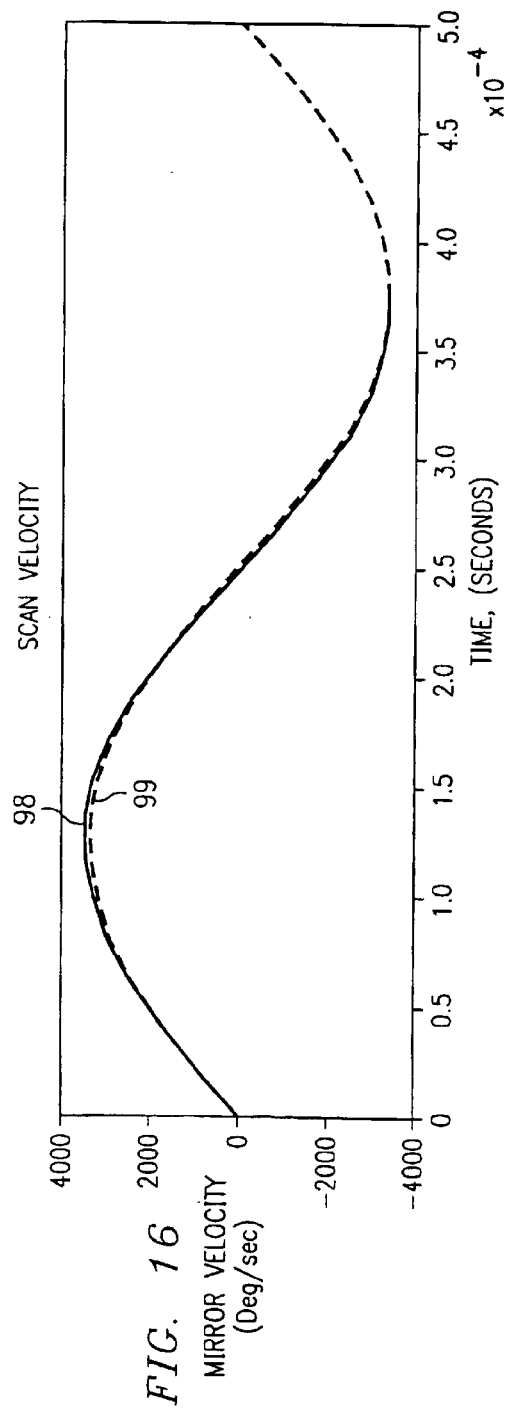
FIG. 16 is a plot showing angular velocity of the mirror portion of the third embodiment versus time, as compared to a perfect sinusoid.

For the device configuration of the third embodiment example shown herein, the resonance frequency is about 2 kHz. The device may be designed and configured to provide a different resonance frequency to match the desired or needed frequency for the scanning movement provide by a laser reflected from the mirror portion 40, for example. FIG. 16 is a plot of the mirror's angular velocity versus time. There are two curves shown in FIG. 16. One curve 98 is a perfect sinusoidal plot, and the other curve 99 is the simulated angular velocity of the third embodiment to show how closely the angular velocity of the mirror resembles a perfect sinusoid, which is a good indication of how finely tuned and smooth the third embodiment is.

Figure 17:
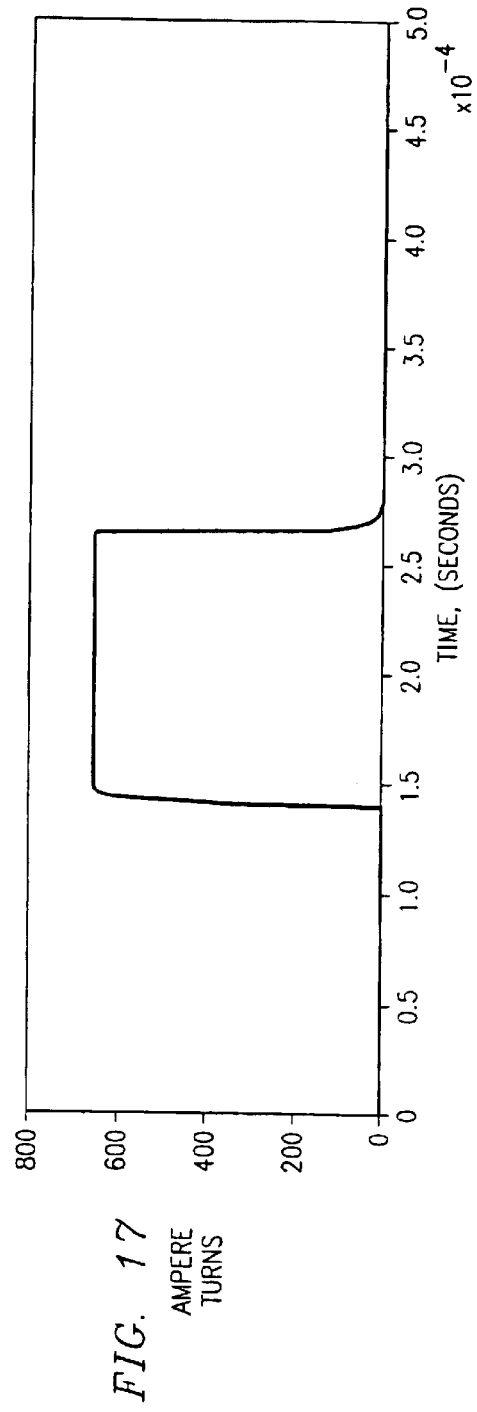
FIG. 17 is a plot of ampere turns versus time corresponding to the same time period of FIG. 16.
Figure 18:
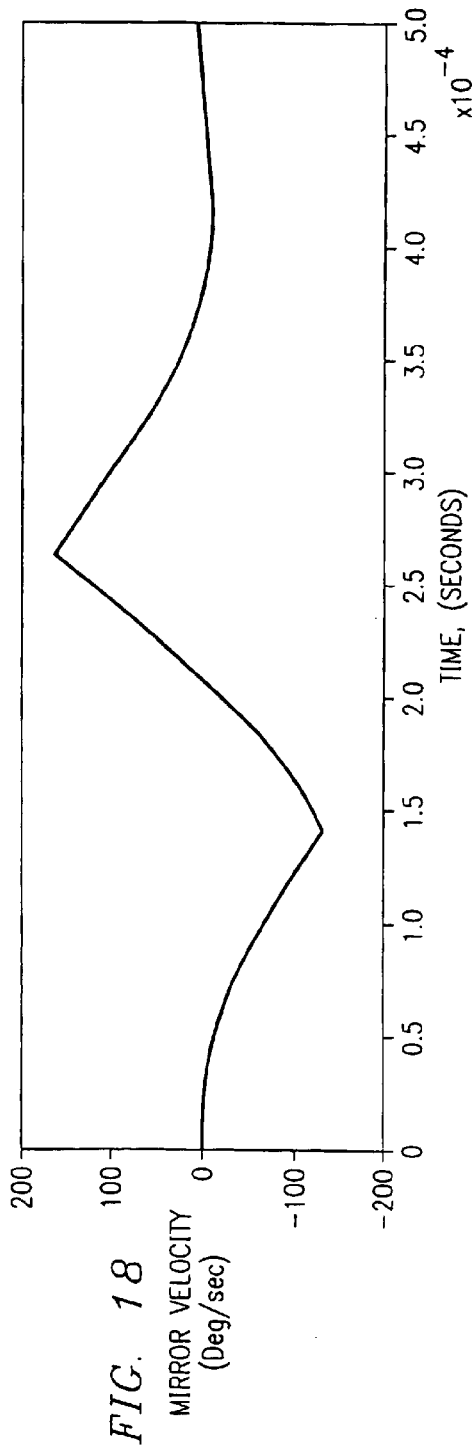
FIG. 18 is a plot of the difference between the mirror velocity and the perfect sinusoid in FIG. 16.
Figure 19:
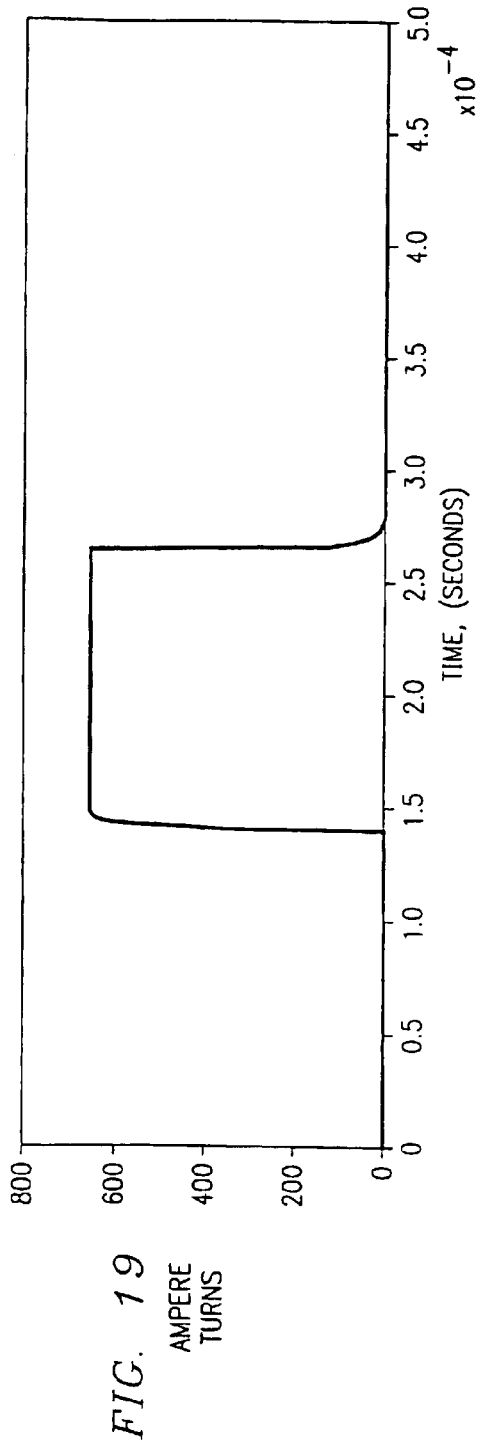
FIG. 19 is a plot of ampere turns versus time corresponding to the same time period of FIG. 18.

The pulse plot of FIG. 17, when compared with the plot of FIG. 16, indicates that the mirror portion is driven by the reluctance force motor 22 on an up swing, i.e., while the hinge portion 30 is being twisted. FIG. 18 is the difference between the perfect sinusoid curve 98 and the simulated angular velocity of the mirror (curve 99) to show the apparent distortion, which is less than 5%. Comparing FIG. 18 with FIG. 19 (which is the same as FIG. 17) reveals that this distortion in the angular velocity curve 99 (i.e., compared to a perfect sinusoid 98) is due to driving the mirror portion 40 asymmetrically. In other words, because the mirror portion's motion is driven on only one part of the total angular movement and on only one of the twists of the hinge portion, the angular velocity curve 98 does not follow a perfect sinusoid 99.

Referring back to FIG. 11, the mathematical model 96 of the third embodiment will now be described. Beginning on the top left side of the diagram in FIG. 11, the pulse generator (block 101) generates a voltage in a pulse pattern, as shown in FIG. 15 for example. Hence, arrow 102 represents voltage. Block 103 represents the coil inductance and resistance in the wire 52. Arrow 104 represents the current times the number of turns in the coiled wire 52 (NI). Arrow 105 represents the instantaneous reluctance of the circuit 50. Note that the total reluctance for the circuit 50 varies as the spaced distances of the air gaps 54 vary. Block 106 represents the equation for the magnetic flux, which is: $\Phi=NI/R$, where $\Phi$ is the magnetic flux, N is the number of turns in the coiled wire 52, I is the current through the coiled wire 52, and R is the instantaneous reluctance in the magnetic circuit 50. Note also that $\Phi=BA$, where B is the flux density and A is the cross-section area of the flux path. Arrow 107 is the product from block 106. Block 108 squares the product (arrow 107). Block 109 is a constant dependant on the configuration and material properties of the magnetic circuit 50. The magnetic force generated by the reluctance force motor 22 is proportional to the square of the magnetic flux $\Phi$ based on the constant (block 109). Block 110 represents the number of air gaps 54 (4) times the radial distance from the pivot axis 48 (d). Arrow 113 represents the instantaneous torque exerted on the mirror portion 40 by the reluctance force motor 22. Block 111 is a comparator that subtracts the value represented by arrow 112 from the value represented by arrow 113, where arrow 112 represents the instantaneous torque exerted on the mirror portion 40 by the hinge portion 30 (hinge stiffness and hinge damping). Block 114 represents the inertia of the mirror portion 40. Arrow 115 represents the acceleration of the mirror portion 40, and arrow 116 represents the velocity of the mirror portion 40. Arrow 117 represents the angular position in radians of the mirror portion 40. Block 118 converts the radians to degrees for the plots (block 119). Block 120 represents the damping by the hinge portion 30, which will depend on the dimensions and material of the hinge portion 30. Arrow 121 represents the retarding torque due to the velocity of the mirror portion 40. Block 122 represents the stiffness of the hinge portion 30, which again depends on the dimensions and material of the hinge portion 30. Arrow 123 represents the retarding torque due to the stiffness of the hinge portion 30. Block 124 is a comparator that adds the torque components of the hinge portion 30 to provide the instantaneous torque of the hinge portion 30 (arrow 112). Arrow 125 represents the instantaneous angular position of the mirror portion 40 in radians (from arrow 117). Based on the angular position of the mirror portion 40, the spaced distances 81, 83, 84, 85 at the air gaps 54 can be calculated, which effects the total reluctance of the circuit 50 (arrow 105). Block 126 applies the sine function to the angle. Block 127 is a constant representing the air gap 54 at zero degrees (i.e., the neutral position), as a reference. Block 128 is a comparator to calculate the delta air gap (arrow 129). Block 130 represents a constant multiplier for calculating the instantaneous reluctance at the air gaps 54 (arrow 131). Block 132 represents the total reluctance for the fixed paths along the magnetic flux channeling circuit 50 (i.e., not including the variable air gaps 54). Block 133 is a comparator that adds the reluctance for the fixed path (block 132) and the instantaneous reluctance at the air gaps 54 (arrow 131) to get the instantaneous total reluctance for the circuit 50 (arrow 105). Thus, the mathematical model 96 of FIG. 11 may be used to model the dynamics of the device 20 of the third embodiment on the computer as a simulation, which may be useful in designing and tweaking the device 20 before actually building it. Other embodiments having different ranges of angular motion, using different materials (for the sheet and/or magnetic circuit portions), and/or using different dimensions also may be modeled, simulated, and tweaked using the mathematical model 96 provided in FIG. 11.

Figure 20:
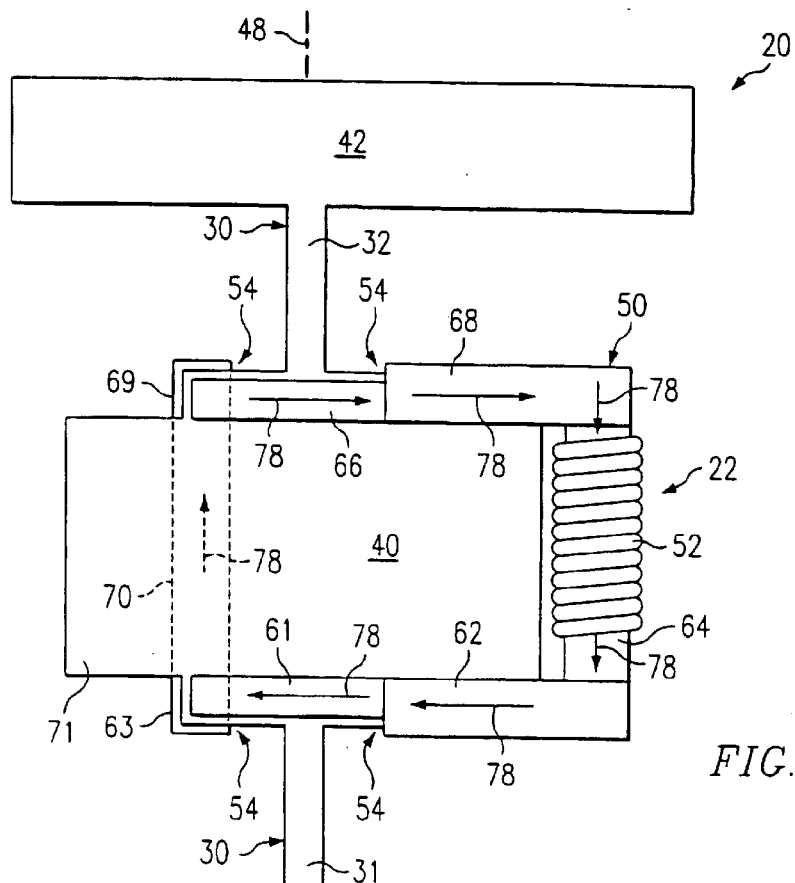
FIG. 20 is top view of a fourth embodiment of the present invention.

FIG. 20 shows a top view of fourth embodiment of the present invention. The fourth embodiment is essentially the same as the third embodiment (see FIG. 6), except that the flame portion 42 is different. Hence, the fourth embodiment illustrates that the frame portion 42 need not completely border the mirror portion 40 and that the size and shape of the frame portion 42 may vary. With the benefit of this disclosure, one of ordinary skill in the art will realize many other possible variations for the frame portion 42 to suit the needs of a particular application.

Figure 21:
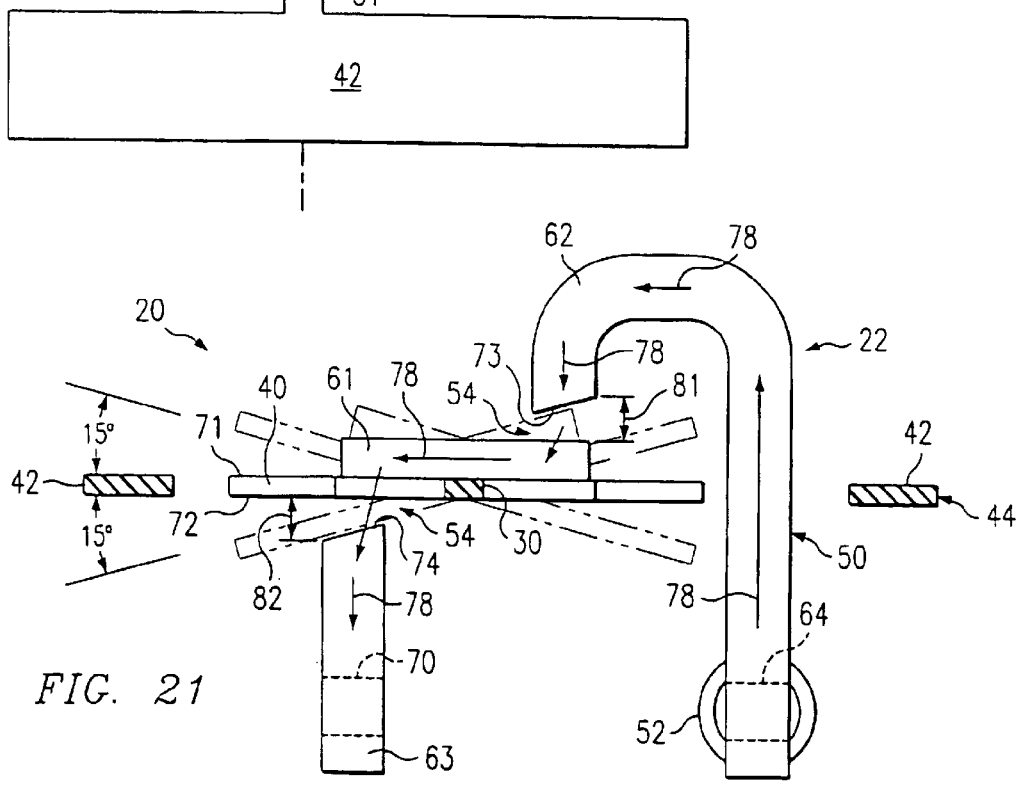
FIG. 21 is a cross-section view of a fifth embodiment of the present invention.

FIG. 21 shows a cross-section view of a fifth embodiment of the present invention. The fifth embodiment is essentially the same as the third embodiment (see FIG. 7), except that the fifth embodiment has portions of the magnetic circuit 50 attached to just one side (e.g., first side 71) of the mirror portion 40 rather than both sides. Hence, the fifth embodiment illustrates that the number and positioning of the magnetic circuit portions attached to the mirror portion 40 may vary for a given embodiment of the present invention. Although more expensive, having the circuit portions attached to both sides 71, 72 of the mirror portion 40 symmetrically is preferable to provide better balance and less distortion due to thermal stresses.

Some example applications of embodiments of the present invention include, but are not limited to: a scanning mirror device in a laser jet printer, a scanning mirror for a digital projection system (e.g., digital light projector, LCD projector), and a scanning mirror for a bar code type scanner, for example. With the benefit of this disclosure, one of ordinary skill in the art will realize many other possible uses and applications incorporating an embodiment of the present invention.

It will be appreciated by those skilled in the art having the benefit of this disclosure that an embodiment of the present invention provides a movable mirror device driven by a reluctance force motor. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A movable mirror device, comprising:
   a sheet having a frame portion, a hinge portion, and a mirror portion formed therein,
   the hinge portion having a pivot axis,
   the mirror portion being coupled to the frame portion via the hinge portion so that the mirror portion can pivot about the pivot axis relative to the frame portion, wherein the hinge portion is twisted when the mirror portion pivots about the pivot axis and the twisted hinge portion biases the mirror portion toward a neutral relaxed position where the mirror portion is substantially aligned with a plane of the frame portion, and the mirror portion having a first side and a second side, and
   the frame portion at least partially bordering the mirror portion;
   a magnetic flux channeling circuit comprising a first circuit portion, a second circuit portion, a third circuit portion, and a fourth circuit portion,
   the first circuit portion being attached to the first side of the mirror portion, and the first circuit portion being separated from the remainder of the magnetic circuit portions when the mirror portion is in the neutral position,
   the second circuit portion extending on the first side of the mirror portion, wherein an end of the second circuit portion is separated from the first circuit portion by a first spaced distance when the mirror portion is in the neutral position, and
   the third circuit portion extending on the second side of the mirror portion,
   wherein an end of the third circuit portion is separated from the second side of the mirror portion by a second spaced distance when the mirror portion is in the neutral position; and
   a wire of electrically conducting material coiled about the fourth circuit portion such that a magnetic field is induced within the fourth circuit portion and through the magnetic flux channeling circuit when electrical current flows through the wire.

2. The movable mirror device of claim 1, wherein the sheet comprises a silicon based material.

3. The movable mirror device of claim 1, wherein the portions of the magnetic flux channeling circuit comprise an alloy with a high permeability with respect to air.

4. The movable mirror device of claim 1, wherein the hinge portion has two parts, a first part of the hinge portion being located on one end of the mirror portion, and a second part of the hinge portion being located on an opposite end of the mirror portion.

5. The movable mirror device of claim 1, wherein the second, third, and fourth circuit portions are part of a single piece, such that magnetic flux may flow through the magnetic flux channeling circuit from the fourth circuit portion to the second circuit portion, to the first circuit portion, to the third circuit portion, and back to the fourth circuit portion to complete one circuit loop.

6. The movable mirror device of claim 5, wherein the magnetic flux channeling circuit further comprises:
   a fifth circuit portion being attached to the second side of the mirror portion, wherein the end of the third circuit portion is separated from the fifth circuit portion by a third spaced distance when the mirror portion is in the neutral position, such that magnetic flux may flow through the magnetic flux channeling circuit from the fourth circuit portion to the second circuit portion, to the first circuit portion, to the fifth circuit portion, to the third circuit portion, and back to the fourth circuit portion to complete one circuit loop.

7. The movable mirror device of claim 1, wherein the magnetic flux channeling circuit further comprises:
   a fifth circuit portion being attached to the second side of the mirror portion, wherein the end of the third circuit portion is separated from the fifth circuit portion by a third spaced distance when the mirror portion is in the neutral position.

8. The movable mirror device of claim 7, wherein the magnetic flux channeling circuit further comprises:
   a sixth circuit portion attached to the first side of the mirror portion, and the sixth circuit portion being separated from the remainder of the magnetic circuit portions when the mirror portion is in the neutral position;
   a seventh circuit portion being attached to the second side of the mirror portion, and the seventh circuit portion being separated from the remainder of the magnetic circuit portions when the mirror portion is in the neutral position;
   an eighth circuit portion extending on the first side of the mirror portion, wherein an end of the eighth circuit portion is separated from the sixth circuit portion by a fourth spaced distance when the mirror portion is in the neutral position, wherein the second circuit portion, the fourth circuit portion, and the eighth circuit portion form a single piece;
   a ninth circuit portion extending on the second side of the mirror portion, wherein an end of the ninth circuit portion is separated from the seventh circuit portion by a fifth spaced distance when the mirror portion is in the neutral position; and
   a tenth circuit portion extends between and connects the third circuit portion to the ninth circuit portion, wherein the third, ninth, and tenth circuit portions form a single piece, wherein magnetic flux may flow through the magnetic flux channeling circuit from the fourth circuit portion to the second circuit portion, to the first circuit portion, to the fifth circuit portion, to the third circuit portion, to the tenth circuit portion, to the ninth circuit portion, to the seventh circuit portion, to the sixth circuit portion, to the eighth circuit portion, and back to the fourth circuit portion to complete one circuit loop.

9. The movable mirror device of claim 8, wherein the ends of the second and eighth circuit portions provide a first set of pivot stops to limit the pivotal movement range of the mirror portion in a first angular direction.

10. The movable mirror device of claim 9, wherein the ends of the third and ninth circuit portions provide a second set of pivot stops to limit the pivotal movement range of the mirror portion in the first angular direction.

11. The movable mirror device of claim 9, wherein the pivotal movement range of the mirror portion in the first angular direction from the neutral position is about 15 degrees.

12. The movable mirror device of claim 1, wherein the end of the second circuit portion provides a pivot stop to limit the pivotal movement range of the mirror portion in a first angular direction.

13. The movable mirror device of claim 1, wherein the end of the third circuit portion provides a pivot stop to limit the pivotal movement range of the mirror portion in a first angular direction.

14. A laser printer device incorporating the movable mirror device of claim 1.

15. A bar code scanner system incorporating the movable mirror device of claim 1.

16. A digital light projector incorporating the movable mirror device of claim 1.

17. A movable mirror device, comprising:

a sheet having a frame portion, a hinge portion, and a mirror portion formed therein, the hinge portion having a pivot axis, the mirror portion being coupled to the frame portion via the hinge portion so that the mirror portion can pivot about-the pivot axis relative to the frame portion, wherein the hinge portion is twisted when the mirror portion pivots about the pivot axis and the twisted hinge portion biases the mirror portion toward a neutral relaxed position where the mirror portion is substantially aligned with a plane of the frame portion, and the mirror portion having a first side and a second side, and the frame portion at least partially bordering the mirror portion; and a magnetic flux channeling circuit comprising:

a first circuit portion attached to the first side of the mirror portion, and the first circuit portion being separated from the remainder of the magnetic circuit portions when the mirror portion is in the neutral position, a second circuit portion extending on the first side of the mirror portion, wherein an end of the second circuit portion is separated from the first circuit portion by a first spaced distance when the mirror portion is in the neutral position, a third circuit portion extending on the second side of the mirror portion, wherein an end of the third circuit portion is separated from the second side of the mirror portion by a second spaced distance when the mirror portion is in the neutral position, a fourth circuit portion having a wire of electrically conducting material coiled thereabout such that a magnetic field is induced within the fourth circuit portion and through the magnetic flux channeling circuit when electrical current flows through the wire, a fifth circuit portion being attached to the second side of the mirror portion, wherein the end of the third circuit portion is separated from the fifth circuit portion by a third spaced distance when the mirror portion is in the neutral position, a sixth circuit portion attached to the first side of the mirror portion, and the sixth circuit portion being separated from the remainder of the magnetic circuit portions when the mirror portion is in the neutral position, a seventh circuit portion being attached to the second side of the mirror portion, and the seventh circuit portion being separated from the remainder of the magnetic circuit portions when the mirror portion is in the neutral position, an eighth circuit portion extending on the first side of the mirror portion, wherein an end of the eighth circuit portion is separated from the sixth circuit portion by a fourth spaced distance when the mirror portion is in the neutral position, wherein the second circuit portion, the fourth circuit portion, and the eighth circuit portion form a single piece, a ninth circuit portion extending on the second side of the mirror portion, wherein an end of the ninth circuit portion is separated from the seventh circuit portion by a fifth spaced distance when the mirror portion is in the neutral position, and a tenth circuit portion extends between and connects the third circuit portion to the ninth circuit portion, wherein the third, ninth, and tenth circuit portions form a single piece, wherein magnetic flux may flow through the magnetic flux channeling circuit from the fourth circuit portion to the second circuit portion, to the first circuit portion, to the fifth circuit portion, to the third circuit portion, to the tenth circuit portion, to the ninth circuit portion, to the seventh circuit portion, to the sixth circuit portion, to the eighth circuit portion, and back to the fourth circuit portion to complete one circuit loop.

18. A laser printer device incorporating the movable mirror device of claim 17.

19. A bar code scanner system incorporating the movable mirror device of claim 17.

20. A digital light projector incorporating the movable mirror device of claim 17.

* * * * *